US008528172B2

(12) United States Patent
Andersen

(10) Patent No.: US 8,528,172 B2
(45) Date of Patent: Sep. 10, 2013

(54) FOLDING PLASTIC CLIP FOR PLEATED BLINDS

(75) Inventor: Torben Meyer Andersen, Svendborg (DK)

(73) Assignee: Faber A/S, Ryslinge (DK)

( * ) Notice: Subject to any disclaimer, the term of this patent is extended or adjusted under 35 U.S.C. 154(b) by 573 days.

(21) Appl. No.: 11/817,711

(22) PCT Filed: Mar. 7, 2006

(86) PCT No.: PCT/DK2006/000134
§ 371 (c)(1), (2), (4) Date: Aug. 26, 2008

(87) PCT Pub. No.: WO2006/094506
PCT Pub. Date: Sep. 14, 2006

(65) Prior Publication Data
US 2009/0165966 A1 Jul. 2, 2009

(30) Foreign Application Priority Data
Mar. 8, 2005 (DK) ................................ 2005 00347

(51) Int. Cl.
*F16G 11/00* (2006.01)

(52) U.S. Cl.
USPC .................... 24/129 R; 24/115 K; 160/178.2

(58) Field of Classification Search
USPC ......... 24/128, 132 R, 132 AA, 136 K, 115 H, 24/122.6, 68 A, 68 F, 115 R, 115 A, 265 A, 24/265 R, 129, 115 K; 160/178.1 R, 178.2
See application file for complete search history.

(56) References Cited

U.S. PATENT DOCUMENTS

| | | | | |
|---|---|---|---|---|
| 948,585 | A * | 2/1910 | Bartran | 24/28 |
| 1,080,823 | A * | 12/1913 | Freschl | 292/325 |
| 1,188,026 | A * | 6/1916 | Warman | 24/18 |
| 1,275,130 | A * | 8/1918 | Carlson | 24/18 |
| 1,722,908 | A * | 7/1929 | Geiseler | 24/18 |
| 1,784,679 | A * | 12/1930 | Paterson | 24/30.5 R |
| 2,440,012 | A * | 4/1948 | Haver | 24/30.5 R |
| 2,560,723 | A * | 7/1951 | Hansen | 43/17.2 |
| 2,712,958 | A * | 7/1955 | Stelzer | 292/325 |
| 2,914,139 | A * | 11/1959 | Rose | 188/65.1 |
| 5,440,789 | A * | 8/1995 | Lofland | 24/132 R |
| 5,788,294 | A * | 8/1998 | Leon et al. | 292/307 R |
| 6,842,949 | B2 * | 1/2005 | Warren | 24/135 N |

FOREIGN PATENT DOCUMENTS

| | | | |
|---|---|---|---|
| DE | 3739317 | A | 7/1989 |
| WO | 2004043212 | A | 5/2004 |

* cited by examiner

*Primary Examiner* — Robert J Sandy
*Assistant Examiner* — Michael Lee
(74) *Attorney, Agent, or Firm* — Pearne & Gordon LLP

(57) ABSTRACT

Traditional fixing of raising cords on pleated blinds occurs by sewing plastic flaps in place that hold knots on the raising cords. Adjustment of tension in the raising cords is difficult, because it may be required to loosen the knot and re-tie it in a better location. Loosening and re-tying is avoided in that a plastic clip has slits, in which the raising cords are pinched and locked after being wound 1½ turn around an interjacent tongue in the plane of the plastic clip.

24 Claims, 2 Drawing Sheets

Figure 1:
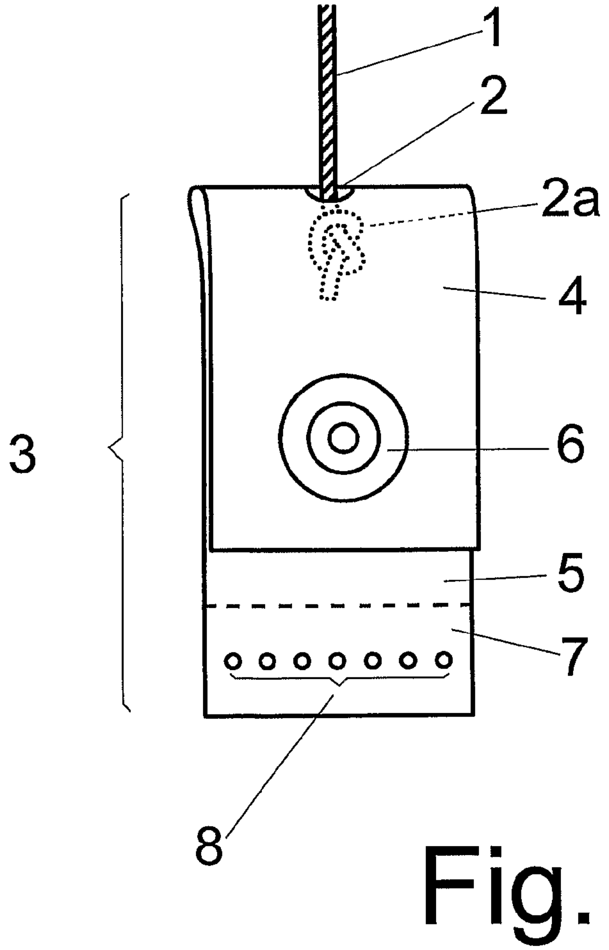

PRIOR ART 1
40
41
42
43
44
45
46
47
48
50
51
52
53
54
55
56
57
70
80

FOLDING PLASTIC CLIP FOR PLEATED BLINDS

The invention relates to a folding plastic clip for pleated fabric blinds that are raised in horizontal pleats by means of a number of parallel raising cords.

Pleated blinds are constructed with a number of vertical raising or draw cords, that go from the top rail through loops of a suitable material fitted in the same horizontal height, where it is intended that a pleat shall appear during raising. At the bottom each raising cord is joined to the bottom rail. A known solution brings all the raising cords through the top rail to one side, where they are brought out and connected as a pull-cord by means of a knot subsequent to being all suitably tightened during installation. Raising occurs by pulling downwards on the knot, and in the upper position the joined pull-cord has maximum length.

However, there has been a need for operation by means of an endless cord or ball-cord, like e.g. roller blinds and Venetian blinds. In this case the raising cords are in a different known solution wound on drums during raising and unwound during lowering. During the assembly each string must be tightened suitably and fastened to the bottom rail, preserving the desired tightening, so that the weight of the pleated blind is carried equally by the raising cords.

The attachment to the bottom rail may occur by means of upwards protruding plastic fitting, which are sewn in place and which may receive the raising cord and retain it. For instance, an oblong plastic flap with a hole may be used, through which the raising cord may be pulled, whereupon it is suitably tightened, and a knot is made on the raising cord. To finish the operation the plastic flap may be folded, and a snap fastener may maintain it in the closed position with the knot hidden. The knot thereby defines the end of the raising cord. Hereby the knot is carried by the fold in the plastic flap, and it is a question of experience to place the knot correctly with respect to a not yet closed plastic flap. A construction of this type is in principle known from DE 37 39 317 A1. In order to obtain an equalized pull in the various raising cords the knot must be placed accurately, and subsequent adjustment requires untying the knot and a different placement. This has turned out to be a slow process in manufacture.

This disadvantage is eliminated by means of a plastic clip according to the invention, which is particular in that the plastic clip consists of a carrying part and a locking part, with an interjacent hinge part, that the carrying part has a first and a second slit with an interjacent tongue in the plane of the clip, that the slits open to the same side, and that the raising cord is locked by being brought 1½ times around the tongue. The narrowness of the slits in relation to the thickness of the cord will entail that sufficient friction is obtained to retain the raising cord with a force that may be overcome during fine adjustment, and the winding and closing of the clip will further lock the raising cord in the adjusted position.

Such a further locking occurs by cooperating means in the carrying part and the locking part, in that the second slit is secured against expansion by protruding parts that transfer forces from the carrying part to the locking part. Hereby it is completely assured that the raising cords cannot be displaced, even though there is a pulling load on the plastic clip.

A further improved locking may be obtained, in that the cooperating means in the carrying part and the locking part cooperate in transferring compressive forces from one part of the carrying part to another part of the carrying part. Hereby the carrying part obtains a strength that fully compensates for a possible reduction in strength caused by the slits.

A further advantageous embodiment of the invention is particular in that a hole for introduction of the raising cord has a size so that a carpet needle with the raising cord may pass. This solution is enabled by the fact that there are no tensile forces transferred in the hinge part itself.

A further advantageous embodiment of the invention is particular in that the hinge part as well as the tongue are essentially perpendicular to the raising cord. Hereby a particularly compact construction is obtained.

A use of the plastic clip is particular in that the raising cord is brought from the outside through a hole placed immediately adjacent the hinge part, that the raising cord is pushed sideways into the first slit and is given a loop around the tongue ending through the second slit, and that the plastic clip is closed, whereby cooperating parts in the locking part and the carrying part assure that the second slit maintains its narrowness and that the end of the raising cord is retained. It is the first loop around the tongue that provides the calibration of the cord length. Similar to prior art the plastic clip has previously been sewn to the bottom rail together with corresponding clips placed at those locations where the raising cords are to end.

Figures 2, 3, 4:
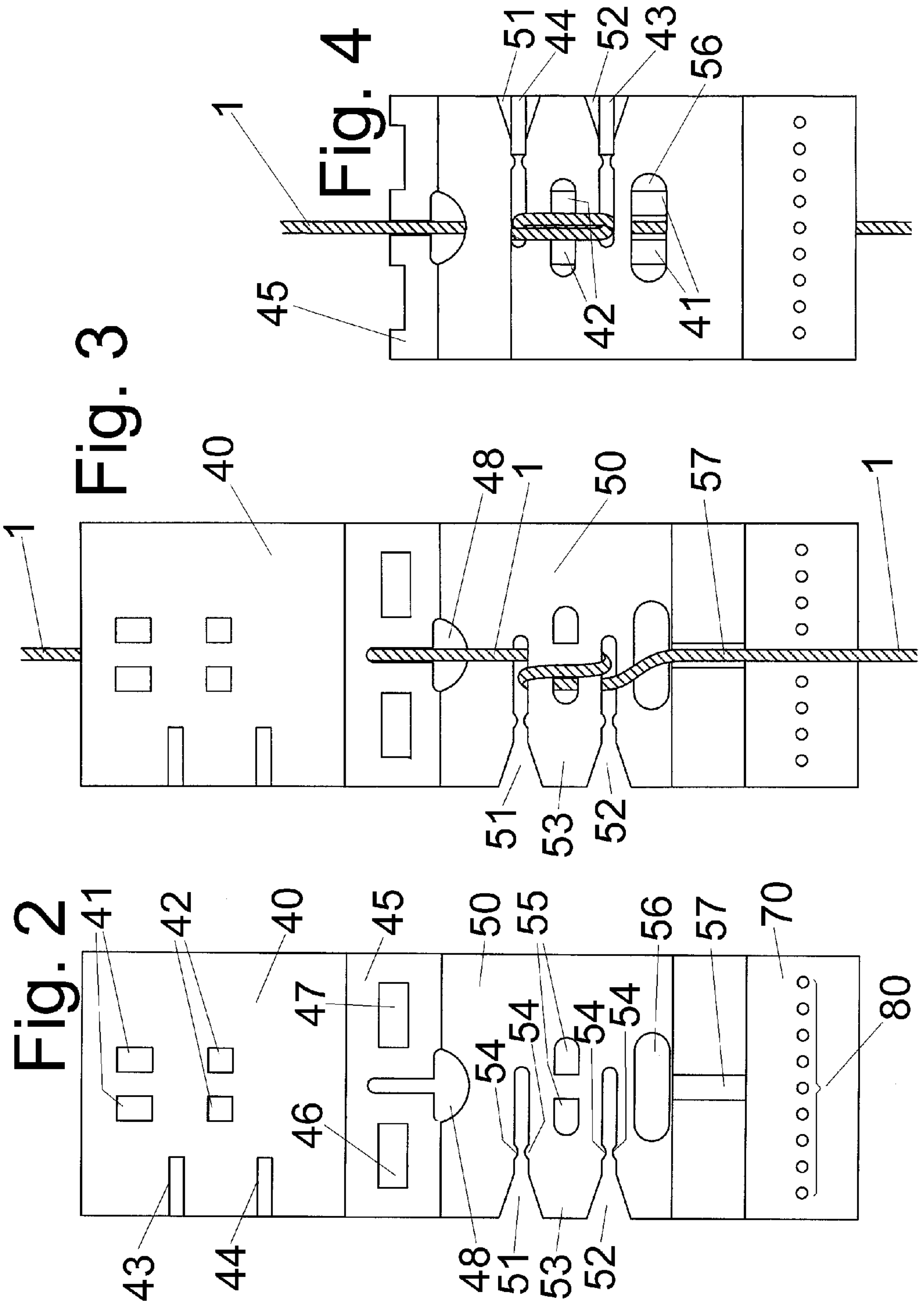

The invention will be described in greater detail in the following with reference to the drawing, in which FIG. 1 shows a plastic flap according to prior art, with a knot on the raising cord, FIG. 2 shows a clip according to the invention, FIG. 3 shows an open clip according to the invention with a fitted raising cord, and FIG. 4 shows the outside of the carrying part in a closed clip with fitted raising cord.

In FIG. 1 a construction according to prior art is seen. The raising cord 1 is pulled through a hole 2 in a plastic flap 3, a knot 2*a* (shown dotted) is made on the raising cord, and the upper half of the plastic flap 4 has been buttoned down over the lower half 5 by means of a snap fastener mechanism 6. The knot 2*a* decides the endpoint of the raising cord. The lower part 7 of the lower part of the plastic flap has previously been sewn into the pleated blind, whereby holes 8 are created.

In FIG. 2 a plastic clip according to the invention is seen. It has the ability to be buttoned together in common with the known clip described above. It consists of a carrying part 50 which has a thinner fixing part 70 which is designed to be sewn into a fold at the lower end of the pleated blind, whereby holes are created as shown at 80. Near the top the carrying part 50 is connected to a locking part 40, and these two parts are connected by a hinge part 45 that like the fixing part 70 is made in a thinner material. Holes 46, 47 are provided in the hinge part 45 in order to define the bending place, and furthermore a hole 48 of a particular shape has been provided. This shape has the width of the thickness of a raising cord above, in order that it may be centred in the plastic clip, and below it has a width that corresponds to the head of a carpet needle or a similar tool that is used for introducing the raising cord.

The carrying part 50 itself has been provided with two slits 51 and 52 and a tongue 53 in between, and the edges of the slits have little protrusions 54. A pair of holes 55 and a hole 56 as well as a channel 57 with a depth corresponding to the thickness of a raising cord have been provided.

The locking part 40 is provided with protrusions 41 that when closed interact with the hole 56 in the carrying part 50. Furthermore further protrusions 42 closer to the hinge part 45 have been provided; these interact when closed with the pair of holes 55. On the same side of the plastic clip as the slits 51 and 52 there are provided protrusions 44 and 43 to block the slits when the plastic clip is closed.

In FIG. 3 is shown how the raising cord 1 is introduced into the plastic clip. It has occurred from behind into the hole 48, whereupon the raising cord is brought to the left and into the slit 51 to the right, past the protrusions 54. Subsequently the raising cord is again brought from below the clip to the side and into the slit 52, whereby it appears again at the upper side of the carrying part 50. The slits 51 and 52 are so narrow that the raising cord is blocked against being pulled out when faced with reasonable forces from the pleated blind. However, a stronger pull in one or the other direction on the plastic clip may shift it on the raising cord for adjustment of the tension of the raising cord. As in the known solution it is desirable that the cord tension is the same for all the raising cords. The end of the raising cord is defined by the first slit. Hereafter the raising cord again brought into the slits 51 and 52, whereupon the raising cord has been wound 1½ times around the tongue 53 and is now in the bottom of the slits. Finally, the raising cord 1 is brought down through the channel 57. The installation is ended by folding down the locking part 40 and snapping it in place to the carrying part. Usually one would not consider the capstan effect of 1½ turns to be sufficient, however, by means of the force transmitting protrusions the lock becomes completely secure in its closed condition.

The plastic clip in its closed condition is shown from behind in FIG. 4. Hereby the slits 51 and 52 are shown facing to the right. It may be seen that the protrusions 42 are pressed into the hole 56 on either side of the raising cord 1, which is thereby centered and directed into the channel 57. Correspondingly, the protrusions 43 and 44 block the slits 52 and 51. This is done because of the strong forces on the plastic clip that may occur during a washing of the pleated blind when the raising cords are solidly fitted to the pleated blind. Hereby it is completely ensured that a loop of the raising cord will not become unhitched from the tongue 53 due to pulling forces. It is hereby enabled that a pleated blind may be washed without removing the raising cords at their lower end (while they must be individually removed from the drums in the top rail). After drying the pleated blind may again be installed, and the upper ends of the raising cords may again be attached to the drums in the top rail, using means that are not described in detail in the present text. These means may advantageously comprise well-defined endings to the raising cord that interact with corresponding well-defined receiving devices in the drums. Hereby it is ensured that the adjusted length is retained for each cord, and hence a pleated blind fitted with clips according to the invention may be washed and re-fitted without the task comprising adjustment of the cord lengths.

The protrusions 41 and 42 have an extent in the longitudinal direction of the clip that is so large that compression forces may be transferred from the edges of the holes 55 and 56, so that the width of the slits are not increased when the raising cord 1 is pulled. Furthermore, forces are transferred to the locking part 40, which is carried by the hinge part 45 to the same degree as the carrying part and hence contributes to the transfer of forces from the raising cord to the bottom of the pleated blind. There is hence in the closed clip obtained a distribution of the load on the two parts, the carrying part and the locking part, even though the raising cord is only actively engaging the carrying part.

The invention claimed is:

1. A folding plastic clip for pleated fabric blinds that are raise in horizontal pleats by means of a number of parallel raising cords, the plastic clip comprising:

a carrying part, a locking part, and an interjacent hinge part with a fold axis, wherein the carrying part includes a first and a second slit that are each open to a common edge of the carrying part wherein the fold axis is perpendicular to said common edge, and an interjacent tongue that extends along an axis that is substantially parallel to the fold axis, wherein the tongue is located in a plane of the clip between the first and second slits such that the tongue shares the common edge with each of the slits, wherein the tongue is configured to lock one of the raising cords by bringing the raising cord 1½ times around the tongue, and wherein the carrying part, the locking part, the interjacent hinge part and the tongue are formed as one-piece.

2. A plastic clip according to claim 1, wherein cooperating parts are provided in the carrying part and the locking part, in that the second slit is secured against expansion by protruding parts in the locking part interacting with the carrying part that transfer forces from the carrying part to the locking part.

3. A plastic clip according to claim 1, wherein cooperating parts in the carrying part and the locking part cooperate in transferring compressive forces from one part of the carrying part to another part of the carrying part.

4. A plastic clip according to claim 1, wherein the clip further includes a hole for introduction of one of the raising cords, and wherein the hole has a size so that a carpet needle with the raising cord may pass.

5. A plastic clip according to claim 1, wherein the hinge part as well as the tongue are configured to be essentially perpendicular to the raising cord.

6. A plastic clip according to claim 1, further comprising a hole placed immediately adjacent the hinge part that is configured to receive a raising cord of the number of parallel raising cords from outside through the hole.

7. A folding plastic clip for pleated fabric blinds that are raised in horizontal pleats by a number of parallel raising cords, the plastic clip comprising:

a carrying part and a locking part that are both configured to extend along a common plane in an open orientation, and an interjacent hinge part positioned between the carrying part and the locking part in the open orientation with the interjacent hinge part permitting folding of the locking part over the carrying part to achieve a closed orientation, wherein the carrying part includes a first and a second slit with an interjacent tongue that each extend from a central portion of the carrying part to a first edge of the carrying part along the common plane in the open orientation, further wherein the slits are each open to the first edge of the carrying part in the open orientation, wherein the tongue is located in the common plane between the first and second slits such that the tongue shares the first edge with each of the slits, wherein the tongue is configured to lock one of the raising cords by bringing the raising cord 1½ times around the tongue, and wherein the carrying part, the locking part, the interjacent hinge part and the tongue are formed as one-piece, wherein the locking part further includes protrusions, wherein the protrusions are configured to enter the first and the second slit when the plastic clip is in the closed orientation.

8. A folding plastic clip for pleated fabric blinds that are raised in horizontal pleats by a number of parallel raising cords, the plastic clip comprising:

a carrying part and a locking part that are both configured to extend along a common plane in an open orientation, and an interjacent hinge part positioned between the carrying part and the locking part in the open orientation with the interjacent hinge part permitting folding of the locking part over the carrying part to achieve a closed orientation, wherein the carrying part includes a first and a second slit with an interjacent tongue that each extend from a central portion of the carrying part to a first edge of the carrying part along the common plane in the open orientation, further wherein the slits are each open to the first edge of the carrying part in the open orientation, wherein the tongue is located in the common plane between the first and second slits such that the tongue shares the first edge with each of the slits, wherein the tongue is configured to lock one of the raising cords by bringing the raising cord 1½ times around the tongue, and wherein the carrying part, the locking part, the interjacent hinge part and the tongue are formed as one-piece, wherein the tongue extends along a tongue axis that is substantially parallel to a fold axis of the interjacent hinge part.

9. The plastic clip according to claim 7, further comprising a hole placed immediately adjacent the hinge part that is configured to receive the raising cord from outside through the hole.

10. Use of a folding plastic clip for pleated fabric blinds that are raised in horizontal pleats by means of a number of parallel raising cords, characterized in that the plastic clip comprises a carrying part and a locking part, with an interjacent hinge part, that the carrying part has a first and a second slit with an interjacent tongue in a plane of the carrying part, that the slits open to the same side, and that one of the raising cords is locked by being brought 1½ times around the tongue, characterized in that:

the raising cord is brought from outside through a hole placed immediately adjacent the hinge part, the raising cord is pushed sideways into the first slit and is given a loop around the tongue ending through the second slit, and the plastic clip is closed, whereby cooperating parts are provided in the locking part and the carrying part and ensure that the second slit maintains its narrowness and that the end of the raising cord is retained.

11. An apparatus for pleated fabric blinds comprising:

a raising cord for pleated fabric blinds; and a folding plastic clip comprising a carrying part for fixing to the pleated fabric blind, the carrying part including a first and second slit that are each open to a common edge of the carrying part, and an interjacent tongue located between the first slit and the second slit, wherein the raising cord is brought 1½ times around the tongue located between the first slit and the second slit, the folding plastic clip further including a locking part and an interjacent hinge part configured to permit folding of the locking part about a hinge axis from an open orientation to a closed orientation, wherein the hinge axis is perpendicular to said common edge.

12. An apparatus of claim 11, wherein the interjacent tongue shares the common edge of the carrying part.

13. An apparatus of claim 11, further comprising cooperating parts provided in the carrying part and the locking part, wherein the second slit is secured against expansion by protruding parts in the locking part interacting with the carrying part that transfer forces from the carrying part to the locking part.

14. An apparatus of claim 11, wherein cooperating parts in the carrying part and the locking part cooperate in transferring compressive forces from one part of the carrying part to another part of the carrying part.

15. An apparatus according to claim 11, wherein the folding plastic clip further includes a hole receiving the raising cord, wherein the hole is configured to receive a carpet needle with the raising cord.

16. An apparatus according to claim 11, wherein the hinge part and the tongue are substantially perpendicular to the raising cord.

17. An apparatus of claim 11, further comprising a hole placed immediately adjacent to the hinge, wherein the raising cord is brought from outside through the hole, the raising cord is pushed sideways into the first slit and is given a loop around the tongue ending through the second slit.

18. An apparatus of claim 17, wherein the locking part is in the closed orientation such that cooperating parts of the locking part and the carrying part ensure that the second slit maintains its narrowness and that the end of the raising cord is retained with respect to the folding plastic clip.

19. An apparatus of claim 11, wherein the locking part further includes protrusions, wherein the protrusions are configured to enter the first and the second slit when the locking part is in the closed orientation to prevent removal of the raising cord from the first and second slit.

20. An apparatus of claim 11, wherein the first and second slit and interjacent tongue each extend along a lateral direction, and the interjacent hinge part includes a fold axis extending along the lateral direction.

21. An apparatus of claim 11, wherein the carrying part, the tongue, the locking part and the interjacent hinge part are formed as one-piece.

22. The plastic clip according to claim 8, further comprising a hole placed immediately adjacent the hinge part that is configured to receive the raising cord from outside through the hole.

23. The apparatus of claim 11, wherein the interjacent tongue extends along a tongue axis that is substantially parallel to a fold axis of the interjacent hinge part.

24. The apparatus of claim 11, wherein the first slit, the second slit and the interjacent tongue each extend along a common plane in the open orientation.

* * * * *

UNITED STATES PATENT AND TRADEMARK OFFICE

CERTIFICATE OF CORRECTION

PATENT NO. : 8,528,172 B2

APPLICATION NO. : 11/817711

DATED : September 10, 2013

INVENTOR(S) : Torben Meyer Andersen

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this

Fifteenth Day of September, 2015

Michelle K. Lee

*Director of the United States Patent and Trademark Office*